Nov. 13, 1962 K. NICOLAY 3,063,321
CLOTH CUTTING APPARATUS
Filed Sept. 30, 1958 2 Sheets-Sheet 1

INVENTOR
KARL NICOLAY
BY Ross & Ross
ATTORNEYS

Nov. 13, 1962 K. NICOLAY 3,063,321
CLOTH CUTTING APPARATUS
Filed Sept. 30, 1958 2 Sheets-Sheet 2
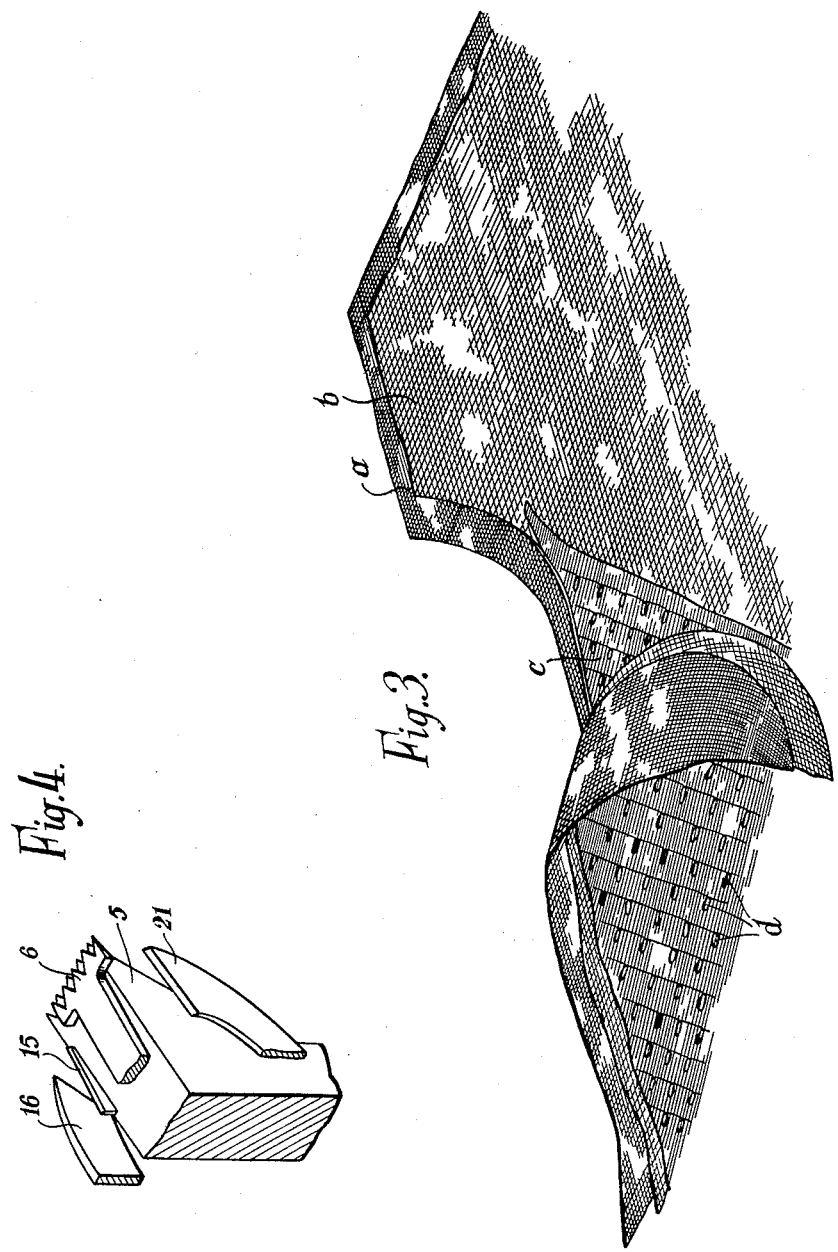
INVENTOR
KARL NICOLAY
BY Ross + Ross
ATTORNEYS

3,063,321
CLOTH CUTTING APPARATUS
Karl Nicolay, Bielefeld, Germany, assignor to Durkopp-werke Aktiengesellschaft, Bielefeld, Germany, a German company
Filed Sept. 30, 1958, Ser. No. 764,445
Claims priority, application Germany Oct. 3, 1957
5 Claims. (Cl. 83—578)

This invention relates to a cloth cutting apparatus for cutting to shape several layers of material which have been united together by pick or basting stitches, and of which one or more layers, for example a linen-horsehair interlining and an inner lining of a part of a garment are to be cut back from the edge of the outer material by a given amount. The cutting back of one layer of material is usually carried out by hand as an additional working procedure after the several layers of material, joined together by the pick or basting stitches, have already been cut to the same size, either by hand or on an edge-cutting apparatus. An apparatus for the cutting back of one layer of material by machine is already known which consists of a sewing machine foot which has on one side a cutter for the separation of the basting stitch threads and on the other side a guide surface for the raising of the upper material and co-operates with an edge cutting apparatus. With the use of this apparatus, it is also necessary to cut all the united layers of material to the same size before the cutting back of the linen-horsehair lining as an additional procedure on an edge cutting apparatus because, on such machine, the raised upper material cannot be cut at the same time as the cutting back of the lining.

The present invention has for its object the provision of a cutting apparatus whereby, in a single working procedure, the upper material can be cut and also the linen-horsehair lining can be cut back simultaneously. Besides the saving of time which results, due to the omission of the second operation, the simultaneous cutting of the layers of material also brings about a qualititive improvement of the workpiece as the distance between the edges of the two layers of material remains absolutely uniform.

The invention provides a cloth cutting apparatus for cutting the edges of layers of material secured together by pick or basting stitches, and with one or more layers cut back from the edge of the other layer or layers, comprising two cutting mechanisms operating in vertical planes at a fixed distance apart and a horizontal cutting mechanism operating over the whole distance between said planes, said horizontal cutting mechanism being mounted so as to enter between the layers not to be cut back and those to be cut back, and operating slightly in advance of the two other cutting mechanisms.

According to a further feature of the invention, the stationary shearing knife of the cutting apparatus working between the layers of material also carries stationary cutting jaws of the two edge cutting mechanisms, the movable cutting jaws of which mechanisms are formed by knives moved up and down, for example by suitable linkage mechanisms.

One embodiment of the improved cuting apparatus is illustrated in the accompanying drawings, wherein:

FIG. 3 is a perspective representation of the type of workpiece with which the invention is concerned.

FIG. 4 is a perspective representation of the cutting apparatus per se.

Figure 1:
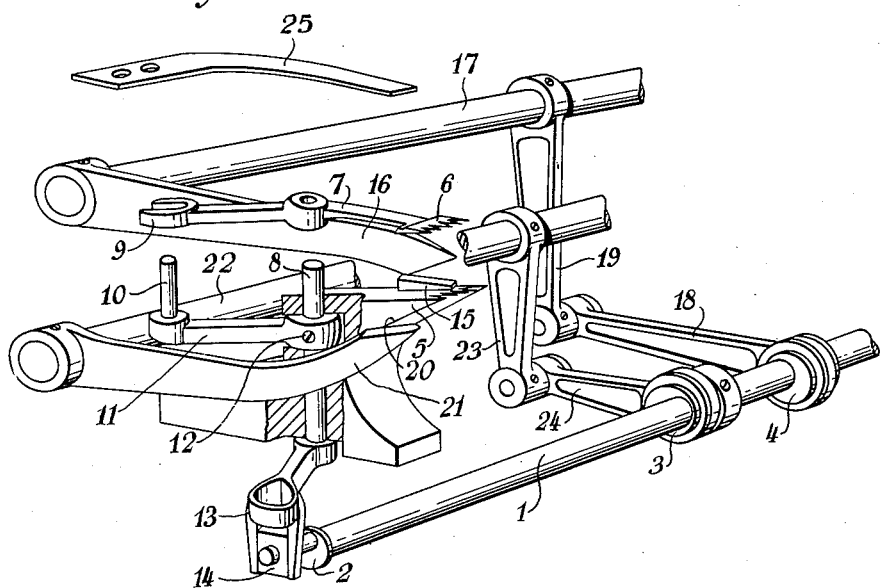
FIG. 1 is an exploded view showing the effective members of the apparatus in perspective, some of the parts being shown in an ineffective position for better understanding.
Figure 2:
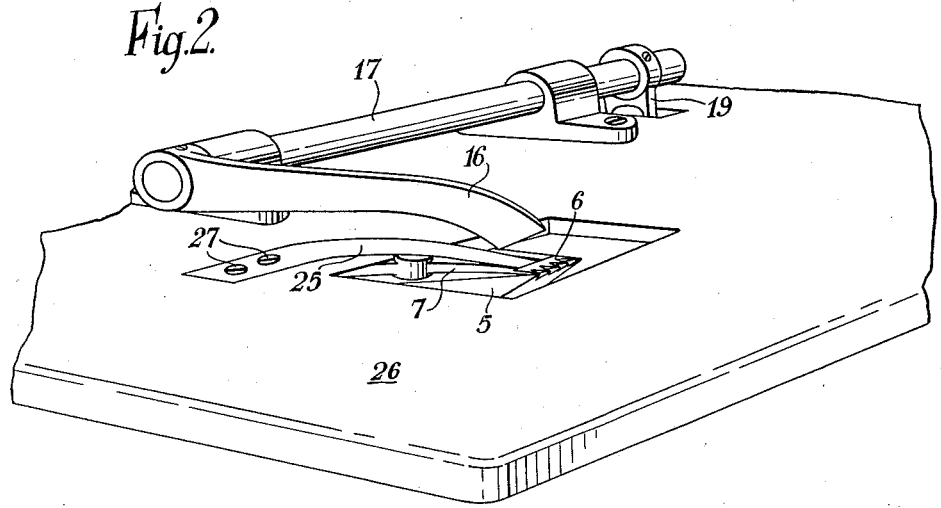
FIG. 2 is a perspective representation of the cutting apparatus built into a work plate.

As shown, the cutting apparatus according to this invention embraces three movable cutting devices which are driven respectively from the eccentrics 2, 3 and 4, all located on a single rotating driving shaft 1. Any known means may be employed for rotating the shaft 1 and this will preferably be under the control of an operator through the medium of a clutch, for intermittent operation similarly to the case of a sewing machine. One of said three cutting devices, co-operates with a stationary, lower, material of the workpiece and separates the threads of the basting or tacking stitches in the region of the other cutting devices, co-operates with a stationary, lower, anvil-like shearing knife 5 and comprises an upper shearing knife 6 movable to and fro in a horizontal plane. The upper shearing knife 6 is fixed on a lever 7 or it may be formed in one piece with that lever. The lever 7 is rotatably mounted on a vertical pin 8 and engages with its fork-like rear end 9 around an upstanding pin 10 which is located on a further lever 11. This lever 11 is rigidly fixed on the said vertical pin 8 by means of the grub screw 12. The pin 8 is rotatably housed in a part 8$^a$ of a framework below the work plate 26 (FIG. 2) and at its lower end it carries a forked lever 13. The fork of this lever is directed downwardly to engage a slide block 14 on a pin extending from the driving eccentric 2. Rotation of the eccentric 2 therefore causes the lever 13 to pivot to and fro, and this movement is transmitted via the pin 8, lever 11 and pin 10 to the said lever 7 carrying the shearing knife 6. The knife 6 on the lever 7 is pressed lightly against the stationary lower shearing knife 5 by means of a leafspring 25 the rear end of which is fixed on the work plate 26 (FIG. 2) by means of screws 27. The knives 5 and 6 have serrated edges and the to-and-fro movements of the upper knife causes the respective cutting edges to cross and exert a shearing action on any thread that comes between them.

The edge cutting means for cutting the edge of the upper layer of material of the workpiece consists on the one hand of a fixed cutting jaw 15 which is located on the anvil-like lower shearing knife 5, and on the other hand of a knife 16 which has a vertical to-and-fro movement. The said knife 16 is rigidly fixed on a horizontal shaft 17, which shaft 17 is rotated in an oscillating manner by the driving eccentric 4 via the pair of link levers 18, 19. Since the shaft 17 is mounted in fixed bearings, the link 18 swings the lever 19 to and fro as the eccentric 4 rotates. The cutting means for the lower layer of material of the workpiece is correspondingly formed; its fixed cutting jaw is formed by the edge 20 of the stationary lower shearing knife 5 whilst its movable cutting knife 21 is fixed on a further shaft 22. This shaft 22 is mounted in fixed bearings and is rotated in an oscillating manner by the driving eccentric 3 via a pair of link levers 23, 24. As will be seen from FIG. 2, shaft 17 is located above the work plate 26 whilst shaft 22 is below the work plate, as also is the main driving shaft 1.

The manner of operation of the cutting apparatus according to the invention will be understood from a consideration of the representation of a workpiece shown in FIG. 3. The workpiece in question is the lapel part of a jacket which is formed from the outer material $a$, a stiff linen insert $b$ and a lining, all these layers being joined together by means of pick stitching $d$. The final shape of the piece is cut after the securing together of the layers of material by said pick stitching $d$, the shaping must be such that the stiff linen insert $b$ and the lining $c$ are cut back by a certain amount compared with the upper material $a$.

The cutting apparatus consisting of the shearing knives 5 and 6 works between the upper material layer $a$ and the stiff linen insert $b$ and separates the threads $d$ over a width which corresponds to the horizontal distance between the upper cutting knife 16 and the lower cutting knife 21. At the same time the upper knife 16 cuts the upper material *a* and the lower knife 21 cuts both the stiff linen insert *b* and the lining. As the knives 16 and 21 are at a fixed distance apart, the cut edges of the layer *a* and of the other two layers remain parallel and, as those knives are at the opposite sides of the cutter 5, the stitches *d* become cut over the whole distance between knives 16 and 21, and at a locality slightly ahead of the cutting points of the knives 16 and 21.

The assembled layers, united together by the stitches *d*, will be brought to the cutting machine with the outer layer *a* uppermost and with the edge to be cut located at the right hand side. The upper layer is cut by the right hand mechanism 15, 16, and the two under layers are cut by the left hand cutting mechanism 20, 21. The parings or trimmings from the left hand cutters pass down below the intermediate cutters 5, 6 and through the opening in the work plate.

What I claim is:

1. Cloth cutting apparatus for cutting the edges of superposed layers of material which have been united together over an area by basting stitches wherefor the resulting edge of at least one layer will be spaced inwardly from the edge of the remaining layers comprising, a support for the superposed layers, a forwardly-extending separating device presenting a pair of relatively reciprocating transverse cutter blades to the basting stitches in front thereof, a first pair of edge cutters located at one side of said separating device, a second pair of edge cutters located at the other side of said separating device, the edge cutters of said pairs thereof having blades lying in the direction of feed of the work material, and driving means operating said transverse cutter and the edge cutters of said pair thereof in synchronism.

2. Cloth cutter apparatus according to claim 1, wherein said driving means includes, a drive for said first pair of edge cutters located above said support and a drive for said second pair of cutters located below said support.

3. Cloth cutting apparatus for cutting the edges of superposed layers of material which have been united together over an area by basting stitches wherefor the resulting edge of at least one layer will be spaced inwardly from the edge of the remaining layers comprising, a support for the superposed layers, a forwardly-extending separating device presenting a pair of relatively reciprocating transverse cutter blades to the basting stitches in front thereof, a first pair of edge cutters located at one side of said separating device, a second pair of edge cutters located at the other side of said separating device, the edge cutters of said pairs thereof having blades lying in the direction of feed of the work material, driving means operating said transverse cutter and the edge cutters of said pair thereof in synchronism, a stationary anvil presenting a forward transverse cutting edge, and two side cutting edges extending in the direction of feed of the work material, wherein said driving means operates a transverse reciprocating cutter blade over said forward edge and a rocking cutter over each of said side edges.

4. Cloth cutting apparatus for cutting the edges of superposed layers of material which have been united together over an area by basting stitches wherefor the resulting edge of at least one layer will be spaced inwardly from the edge of the remaining layers comprising, a support for the superposed layers, a forwardly-extending separating device presenting a pair of relatively reciprocating transverse cutter blades to the basting stitches in front thereof, a first pair of edge cutters located at one side of said separating device, a second pair of edge cutters located at the other side of said separating device, the edge cutters of said pairs thereof having blades lying in the direction of feed of the work material, driving means operating said transverse cutter and the edge cutters of said pair thereof in synchronism, said driving means including a drive for said first pair of edge cutters located above said support and a drive for said second pair of cutters located below said support and including a stationary anvil presenting a forward transverse cutting edge and two side cutting edges extending in the direction of feed of the work material, wherein said driving means operates a transverse reciprocating cutter blade over said forward edge and a rocking cutter over each of said side edges.

5. Cloth cutting apparatus for cutting the edges of layers of material already united together by basting stitches, with the edge of one layer spaced inwardly from that of the other, comprising a work plate, a first cutter shaft above said work plate and a cutter arm thereon, a second cutter shaft below said work plate and a cutter arm thereon, said work plate having an opening opposite the ends of said cutter arms, a fixed cutter element below said opening having a knife on one side edge to engage said first cutter arm and a knife on the opposite side edge to engage the other cutter arm, with a further knife on its front edge, a vertical post in said fixed cutter element and a cutter arm on its top end, said cutter arm engaging the knife at the front of said fixed cutter element, a common driving shaft mounted below said work plate and separate link and lever mechanisms operably connecting such driving shaft to the several cutter arms for simultaneous operation thereof, whereby actuation of the driving shaft imparts reciprocal motion through the linkages and levers causing each of the movable cutter arms to engage its fixed counterpart thereby trimming layers of cloth material and cutting stitches therein in one simultaneous operation.

References Cited in the file of this patent

UNITED STATES PATENTS

| | | |
|---|---|---|
| 441,532 | Bruce | Nov. 25, 1890 |
| 954,553 | Weis | Apr. 12, 1910 |
| 970,733 | McGilvary | Sept. 20, 1910 |
| 2,418,049 | Schild | Mar. 25, 1947 |